United States Patent
Jordan

(10) Patent No.: US 12,528,168 B2
(45) Date of Patent: Jan. 20, 2026

(54) POLYMERIC SLEEVE FOR SELF SEALING FASTENER IN BUILDING PANEL, SHEATHING PANEL CONTAINING THE SAME AND METHOD OF USING THE SAME

(71) Applicant: GP Building Products Services LLC, Atlanta, GA (US)

(72) Inventor: Richard D. Jordan, Dacula, GA (US)

(73) Assignee: GP Building Products Services LLC, Atlanta, GA (US)

( * ) Notice: Subject to any disclaimer, the term of this patent is extended or adjusted under 35 U.S.C. 154(b) by 151 days.

(21) Appl. No.: 17/992,923

(22) Filed: Nov. 22, 2022

(65) Prior Publication Data

US 2023/0211484 A1  Jul. 6, 2023

Related U.S. Application Data

(60) Provisional application No. 63/296,354, filed on Jan. 4, 2022.

(51) Int. Cl.
*B25C 3/00* (2006.01)
*E04B 1/62* (2006.01)
*F16B 15/08* (2006.01)

(52) U.S. Cl.
CPC ............. *B25C 3/006* (2013.01); *E04B 1/625* (2013.01); *F16B 15/08* (2013.01); *E04B 2103/04* (2013.01)

(58) Field of Classification Search
CPC ....... F16B 15/08; F16B 15/0092; B25C 3/006
USPC ......... 206/347, 345, 338, 343; 411/442, 443
See application file for complete search history.

(56) References Cited

U.S. PATENT DOCUMENTS

| | | | | |
|---|---|---|---|---|
| 3,736,198 A | * | 5/1973 | Leistner | B65B 15/04 156/566 |
| 4,162,728 A | * | 7/1979 | Uzumcu | F16B 15/08 206/345 |
| 5,005,699 A | * | 4/1991 | Kawashima | F16B 27/00 206/820 |
| 7,516,841 B2 | * | 4/2009 | Uejima | F16B 15/08 206/346 |
| 7,788,787 B2 | * | 9/2010 | Shelton | F16B 15/08 29/527.2 |

(Continued)

OTHER PUBLICATIONS

International Search Report and Written Opinion received for PCT Application No. PCT/IB2022/061357, mailed on Feb. 22, 2023, 16 pages.

*Primary Examiner* — Steven A. Reynolds
(74) *Attorney, Agent, or Firm* — Alston & Bird LLP

(57) ABSTRACT

A fastener sleeve is described, including a collating sleeve body and a plurality of cylindrical sheaths in the collating sleeve body, each cylindrical sheath engageable with a fastener. A sheathing panel is also described, including at least one barrier overlay secured to a panel, a plurality of fasteners engaged in the barrier overlay and the panel, a plurality of sealing cylindrical sheaths surrounding a portion of each fastener and positioned between the fastener and the barrier overlay, such that the sheathing panel has at least one of the following properties: a water vapor transmission rate of at least 7.0 grams/m²/24 hours at 73° F. and 50% relative humidity (RH), a water vapor permeance of at least 1.3 perms at 73° F. and 50% RH, or an air infiltration rate of less than 0.2 L/s-m² at 75 pascals. A method of engaging the fasteners with the panel is also provided.

14 Claims, 5 Drawing Sheets

(56) References Cited

U.S. PATENT DOCUMENTS

| | | | |
|---|---|---|---|
| 10,495,129 B2 | 12/2019 | Thomas et al. | |
| 10,711,453 B1 | 7/2020 | Jordan et al. | |
| 2004/0265092 A1* | 12/2004 | Lat | B05D 7/14 |
| | | | 411/443 |
| 2010/0236287 A1* | 9/2010 | Summerford | A44C 15/005 |
| | | | 132/200 |
| 2012/0298716 A1* | 11/2012 | Segura | F16B 15/08 |
| | | | 206/343 |
| 2013/0270135 A1* | 10/2013 | Huang | F16B 15/08 |
| | | | 206/347 |
| 2019/0337136 A1* | 11/2019 | Hays | B25C 1/06 |
| 2021/0341008 A1* | 11/2021 | Wigboldy | F16B 15/08 |

\* cited by examiner

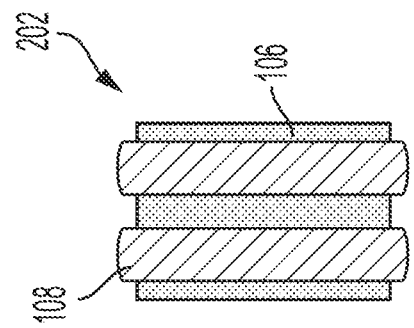
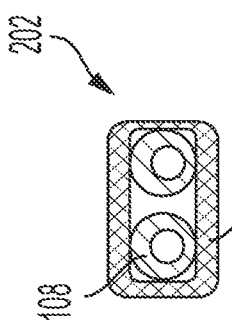
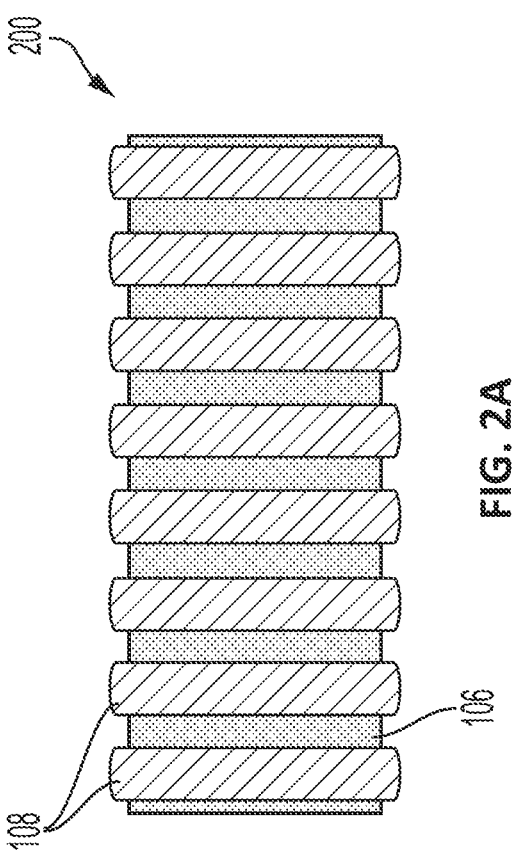
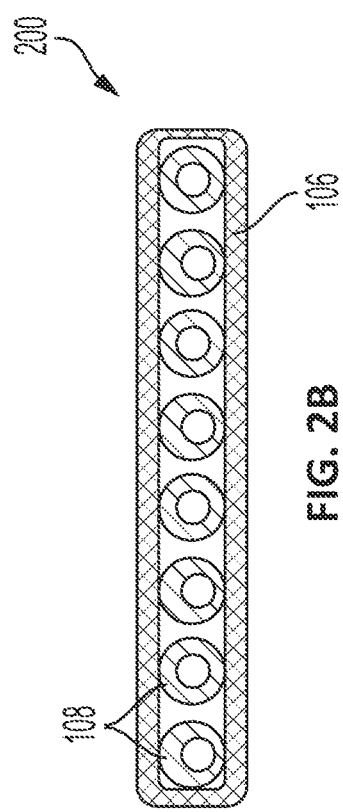

POLYMERIC SLEEVE FOR SELF SEALING FASTENER IN BUILDING PANEL, SHEATHING PANEL CONTAINING THE SAME AND METHOD OF USING THE SAME

CROSS REFERENCE TO RELATED APPLICATIONS

The present disclosure claims priority to and the benefit of U.S. Provisional Patent Application Ser. No. 63/296,354, as filed Jan. 4, 2022; the entire contents of which as are hereby incorporated by reference herein in its entirety.

BACKGROUND

The present disclosure relates to self-sealing fasteners, and more specifically, to polymeric sleeves for self-sealing fasteners in building panels.

Commercial and residential buildings may be constructed by attaching panels, also called sheathing assemblies, to the underlying support frame. The sheathing assemblies are installed on the exterior surfaces of a building's frame, e.g., along the vertical sides and roof. The panels may be, for example, plywood panels or oriented strand board (OSB) panels. The sheathing assemblies may be covered with a layer of a barrier material that reduces the effects of the outside environment on the panels and building interior. The panels are generally aligned side-by-side, with edges of the adjacent panels contacting one another or being in proximity to one another such that the panels form a substantially continuous surface. Fasteners, such as nails, are used to secure the panels to the building structure.

BRIEF SUMMARY

According to one or more exemplary embodiments, a fastener sleeve includes a collating sleeve body and a plurality of cylindrical sheaths in the collating sleeve body, each cylindrical sheath engageable with a fastener.

According to other exemplary embodiments, a sheathing panel includes a barrier overlay secured to a panel and a plurality of fasteners including a smooth metal body and a broadened flat head. The smooth metal body of the fastener is engaged in the barrier overlay and the panel, and the broadened flat head of the fastener is on an outer surface of the sheathing panel. The sheathing panel also includes a plurality of sealing cylindrical sheaths around each smooth metal body and between the broadened flat head of each fastener and the barrier overlay. The sheathing panel is bulk water resistant and has at least one of the following properties: a water vapor transmission rate of at least 7.0 grams per square meter per 24 hours (grams/m2/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m2) at 75 pascals (Pa) as determined by ASTM E2357-11.

Yet, according to other exemplary embodiments, a method of engaging a plurality of fasteners with the sheathing panel includes driving the plurality of fasteners into a sheathing panel. The fasteners include smooth metal bodies within a plurality of cylindrical sheaths in a collating sleeve body, and the sheathing panel includes a barrier overlay secured to a panel. The method includes compressing each cylindrical sheath around the smooth metal body of each corresponding fastener such that the cylindrical sheath remains around the smooth metal body and between a broadened flat head of the fastener and the sheathing panel. The method further includes separating the collating sleeve body from the plurality of cylindrical sheaths as the plurality of fasteners are driven into the sheathing panel, and self-sealing the plurality of cylindrical sheaths around the smooth metal bodies of the plurality of fasteners and between the broadened flat heads and the barrier overlay. The sheathing panel is bulk water resistant and has at least one of the following properties: a water vapor transmission rate of at least 7.0 grams per square meter per 24 hours (grams/m2/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m2) at 75 pascals (Pa) as determined by ASTM E2357-11.

Additional features and advantages are realized through the techniques of the various embodiments described herein, all of which as are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 2A is a side view of a self-sealing fastener sleeve;

FIG. 2B is a top view of FIG. 2A;

FIG. 2C is a side view of a self-sealing fastener sleeve;

FIG. 2D is a top view of FIG. 2C;

DETAILED DESCRIPTION OF VARIOUS EMBODIMENTS

When sheathing panels with water-resistive and air barrier properties are used in building construction, sealant and/or tape is generally needed to seal joints, corners, openings, penetrations, material transitions, and fasteners. That is, a sealant or tape must be used to cover each fastener (e.g., nail) that is used to secure the building panel onto the studs or frame. Amongst various challenges and disadvantages, applying this sealant or tape is labor intensive and time consuming, and improper application of the sealant or tape may lead to leaks at the fastener. Thus, it would be desirable to provide building panel fasteners with self-sealing properties, which would eliminate the need for such sealants/ tapes and provide improved water-resistance properties at the interface of such fasteners and building panels.

Accordingly, embodiments herein address the above-described shortcomings by providing self-sealing fasteners, building panels with self-sealing properties, as well as methods of making and installing such fasteners and panels, and building systems including such fasteners and panels. The self-sealing fasteners maintain an air and water seal barrier when used on building panels with such desired properties. A fastener self-sealing system includes a collating sleeve with a plurality of cylindrical fastener sheaths. The fastener self-sealing system is used in conjunction with a fastener gun in some embodiments, where the collating sleeve is disposed on tapered ends of collated fasteners (e.g., nails), such that the cylindrical fastener sheaths surround and fit snugly around a portion of the respective bodies of the fasteners. The cylindrical fastener sheaths are formed of a polymer having a suitable softness and durability, such that when the fastener is driven into a panel surface by a means, such as a fastener gun, the fastener sheaths slide along the fastener body and are compressed while maintaining a self-seal between the fastener flattened boss, or nail head, and the panel. The described embodiments eliminate the need to apply a separate sealing tape to maintain sheathing panel properties, for example, air and water barriers.

Figure 1:
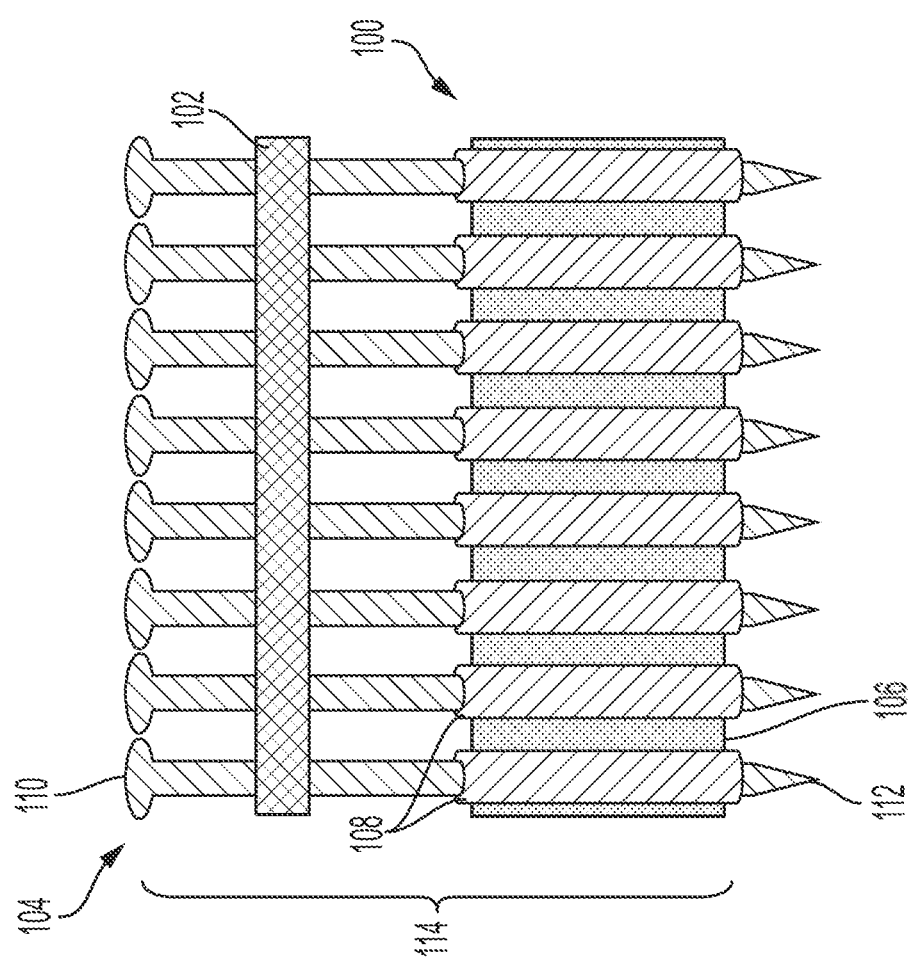
FIG. 1 is a side view of a plurality of fasteners with self-sealing fastener sleeve disposed thereon.

FIG. 1 is a side view of a plurality of fasteners 104 in an exemplary self-sealing fastener sleeve 100 according to various embodiments, the self-sealing fastener sleeve including a collating sleeve body 106 with a plurality of cylindrical sheaths 108 disposed therein and with each cylindrical fastener sheath 108 engaging with a corresponding fastener 104 within the plurality of fasteners. The plurality of fasteners 104 optionally further includes a collating envelope 102 used to assemble the fasteners 104 together. The collating sleeve 102 assembles the fasteners 104 together for use in, for example, a fastener gun.

FIGS. 2A and 2B show side and top views, respectively, of a further exemplary self-sealing fastener sleeve 200 according to various embodiments, the self-sealing fastener sleeve having a collating sleeve body 106 and a plurality of cylindrical sheaths 108 arranged therein, with each cylindrical fastener sheath 108 being engageable with a fastener 104 (e.g., as shown in FIG. 1). FIGS. 2C and 2D show side and top views, respectively, of a still further exemplary self-sealing fastener sleeve 202 with a collating sleeve body 106 with a plurality of cylindrical sheaths 108 disposed therein, with each cylindrical fastener sheath 108 being engageable with a fastener 104 (e.g., also as shown in FIG. 1). While eight (8) cylindrical sheaths 108 are shown in FIGS. 1-2B, and two (2) cylindrical sheaths 108 are shown in FIGS. 2C and 2D, these are only examples and not intended to limit the number of cylindrical sheaths 108. Any number of cylindrical sheaths 108 may be included in the collating sleeve body 106, provided at least two cylindrical sheaths 108 are included. According to one or more embodiments, the collating sleeve body 106 may include between two and thirty cylindrical sheaths 108. In some embodiments, the collating sleeve body 106 may include between 10 and 15 cylindrical sheaths 108; in still other embodiments, the collating sleeve body 106 may include exactly twenty-five cylindrical sheaths 108.

The plurality of cylindrical sheaths 108 may be formed from a polymeric material in certain embodiments. Non-limiting examples of the polymeric materials include polyvinyl carbonate, polyurethane, or a combination thereof. In some embodiments, the polymeric material includes a nitrile elastomer (e.g., commercially available as Buna-N). Of course, the plurality of cylindrical sheaths 108 may be formed from additional or alternative materials, as may be desirable, provided the suitable properties described below remain satisfied.

The selected polymeric material has suitable properties, for example softness, such that the cylindrical sheaths 108 compress around the body of the corresponding fastener 104 when the fastener 104 is driven into the panel. The polymeric material of the cylindrical sheath 108 compresses and remains between the broadened flat head of the fastener 104 and the sheathing panel that it is driven into. According to one or more embodiments, the polymeric material has a softness of about 30A to about 80A durometer—Shore A as measured by ASTM D2240 type A. In other embodiments, the polymeric material has a softness of about 40A to about 70A durometer—Shore A as measured by ASTM D2240 type A. In at least one embodiment, the polymeric material has a softness of about 50A to about 60A durometer; in yet another embodiment the softness may be approximately 55A durometer—Shore A as measured by ASTM D2240 type A. According to other embodiments, the polymeric material has a softness of about 0 to about 30D durometer—Shore D as measured by ASTM D2240 type D; in still other embodiments, the softness may be between 10D and 20D durometer, for example approximately 15D durometer—Shore D as measured by ASTM D2240 type D. ASTM D2240 type A is used for softer materials, and type D is used for stiffer materials. The polymeric material also has a durability such that it survives the force and impact as the fastener 104 is nailed into the sheathing panel.

The cylindrical sheaths 108 are tailored to the dimensions of an associated type of fasteners 104. In certain embodiments, the fasteners 104 are nails. In other embodiments, the fasteners 104 each have a broadened flat head 110 (see e.g., FIG. 1), a smooth metal body 114, and an opposing sharp end 112. The fasteners 104 are typically made from one or more metals, although they may be formed from other materials. The dimensions of the fasteners 104 and cylindrical sheaths 108 are not limited and are tailored to the particular application. The dimensions of the cylindrical sheaths 108 are tailored such that the fastener 104 fits snugly within but slides along the smooth metal body 114 from the opposing sharp end 112 and is compressed at the broadened flat head 110 when driven into a sheathing panel.

The length of the cylindrical sheaths 108 is properly tailored for the type of polymeric material and the type of fastener 104, as sheaths that are too long or too short do not properly seal the fasteners in the panel. In some embodiments, the length of the cylindrical sheaths is about ¼ to about ⅜ inch. In other embodiments, the length of the cylindrical sheaths is about ¼ to about ½ inch. Yet, in other embodiments, the length of the cylindrical sheaths is about ¼ to about 1 inch. In still other embodiments, the length of the cylindrical sheaths may be greater than 1 inch, provided a length of the associated type of fastener 104 remains greater.

According to certain embodiments, the collating sleeve 106 with the plurality of cylindrical sheaths 108 is slid onto and over the sharp ends 112 of a plurality of fasteners 104 and along the smooth metal bodies 114. In some embodiments, the plurality of fasteners 104 is a plurality of nails that further include a collating envelope 102 arranged on another part of the smooth metal bodies 114 of the nails. In at least one embodiment, the collating envelope 102 is positioned nearer the broadened flat head 110 of the fastener 104 than the plurality of cylindrical sheaths 108. In this and other embodiments, along an axis defined by a length of the fasteners 104, the collating envelope 102 and the plurality of cylindrical sheaths 108 are spaced apart a distance from one another, such that a portion of the smooth metal bodies 114 is exposed between the envelope and sheaths, as may be understood, by way of non-limiting example, from FIG. 1.

The collating sleeve body 106 is a material that easily separates from the cylindrical sheaths 108 after being driven into a sheathing panel. The collating sleeve body 106 includes, for example, a polymeric film in some embodiments. In other embodiments, the collating sleeve body 106 includes a cellulosic material. The collating sleeve body 106 is adhered to the cylindrical sheaths 108 by various methods. For example, the collating sleeve body 106 is adhered to the plurality of cylindrical sheaths 108 by an adhesive in some embodiments.

The fastener sleeve 100 with the plurality of fasteners 104 is driven into a sheathing panel, which results in self-sealed fasteners. Being self-sealing, the fasteners maintain the air and water properties of the sheathing panel itself, as discussed below in further detail. As a non-limiting example, a fastener driving means, such as a fastener gun or hammer, is used to drive the fasteners 104 into the sheathing panel and the building support frame in order to secure the sheathing panel to the frame.

Figures 3A, 3B:
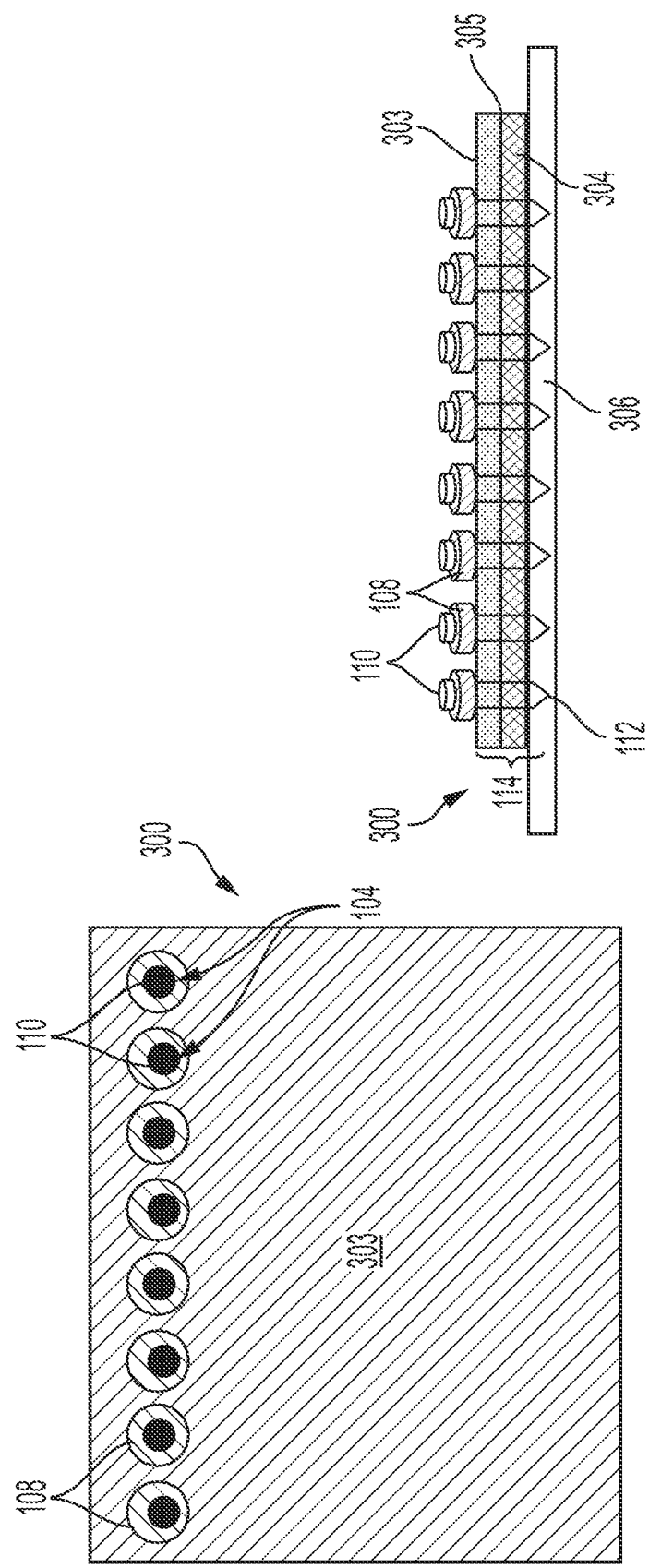
FIG. 3A is a top view of a plurality of sealed fasteners on a sheathing panel.
FIG. 3B is a side view of FIG. 3A.
Figure 4A:
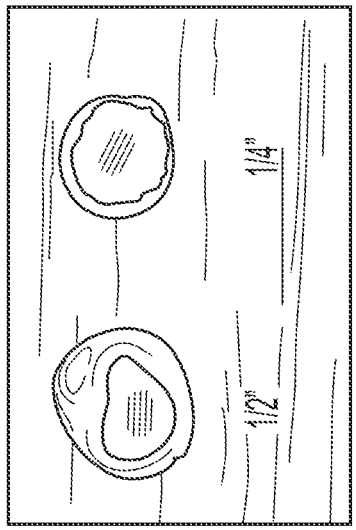
FIG. 4A shows a polyurethane tubing around a fastener.
Figure 4B:
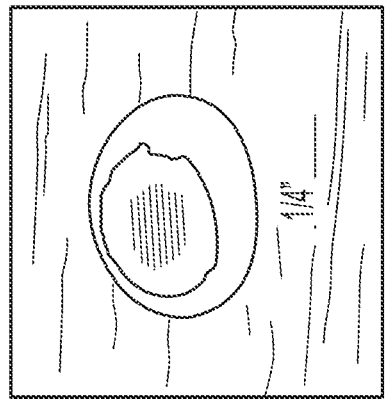
FIG. 4B shows a polyvinyl chloride tubing around a fastener.
Figure 4C:
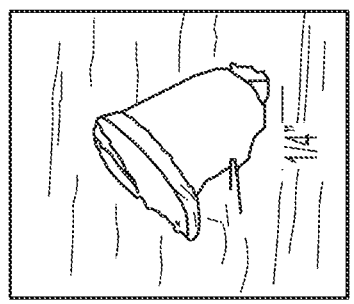
FIG. 4C shows a polyurethane tubing around a fastener.
Figure 4D:
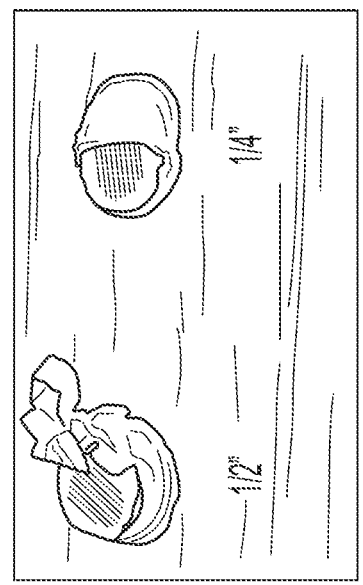
FIG. 4D shows a Buna-N rubber tubing around a fastener.

FIG. 3A is a top view of a plurality of sealed fasteners secured to a sheathing panel 300, and FIG. 3B is a side view of FIG. 3A. According to one or more embodiments, a sheathing panel 300 includes a barrier overlay 303 secured to a panel 304. A plurality of fasteners 104 may, as described previously herein, each include a smooth metal body 114, a broadened flat head 110, and a sharp end 112. The sharp end 112 of each fastener is driven through the sheathing panel 300 to fasten it to a support 306, which may be in some embodiments a structural frame of a building or roof. Each smooth metal body 114 is each engaged in the barrier overlay 303 and the panel 304. In certain embodiments, the broadened flat head 110 of the fastener 104 remains on an outer surface of the sheathing panel 300; in other embodiments, a counter-sunk-type configuration may be desirable (not illustrated). After the plurality of fasteners 104 are driven in the sheathing panel 300, the plurality of sealing cylindrical sheaths 108 remain around the smooth metal bodies 114 and between the broadened flat head 110 of the fastener 104 and the barrier overlay 303, without being broken.

The panel 304 of the sheathing panel is, according to various embodiments, a substrate that includes one or more materials or fibers. Non-limiting examples of suitable materials for the panel 304 include foam, glass, carbon, lignocellulose (also termed lignocellulosic materials), polymers (e.g., polyolefins (such as polypropylene and polyethylene) and polystyrenes), gypsum, metals, cement, or any combination thereof. The panel 304 may be a lignocellulose composite panel including engineered wood products. Engineered wood products include a plurality of substrates composed of wood and/or lignocellulose materials and one or more adhesives to bind, couple, bond, affix, or otherwise join the plurality of materials to one another to form the engineered wood product. Non-limiting illustrative examples of engineered wood products include particleboard, fiberboard (e.g., medium density fiberboard (MDF) and high-density fiberboard (HDF)), wafer board, oriented strand board (OSB), plywood, laminated veneer lumber (LVL), laminated veneer boards (LVB), engineered wood flooring, and the like. The panel 304 may include one or more layers.

The permeability of the panels 304 can be adjusted by methods known to one of ordinary skill in the art to provide the permeability desired for a particular application. In an exemplary embodiment, the panel 304 includes expanded polystyrene (EPS) foam, and the permeability of the EPS foam is tailored to provide the desired permeability, and therefore desired water vapor transmission rate and water vapor permeability. EPS foam products can be obtained from, for example, Atlas EPS (Byron Center, Michigan), ACH Foam Technologies (Westminster, Colorado), Insulfoam (Puyallup, Washington), Universal Foam Products (Hunt Valley, Maryland), ThermaFoam LLC (Hillsboro, Texas), or Insulation Corporation of America (Allentown, Pennsylvania).

The panel 304 is, in certain embodiments, considered "semi-permeable." As used herein, the term "semi-permeable" means that moisture travels bi-directionally and at substantially the same rate through a surface. A semi-permeable surface or layer has a substantially homogenous water vapor transmission rate and water vapor permeance. A semi-permeable surface has a water vapor permeance in a range from about 1.0 to about 10.0 perms as determined by ASTM E96-15 procedure A at 73° F. and 50% RH. Although at some RH levels that are higher than 50%, the panels 304 may have a water vapor permeance higher than 10.0 perms. In some embodiments, the panel has a water vapor permeance of at least 1.3 perms as determined by ASTM E96-15 procedure A at 73° F. and 50% RH. In other embodiments, the panel 304 has a water vapor permeance about or in any range from about 1.0, 1.3, 1.5, 1.7, 2.0, 2.5, 3.0, 3.5, 4.0, 4.5, 5.0, 5.5, 6.0, 6.5, 7.0, 7.5, 8.0, 8.5, 9.0, 9.5, and 10.0 perms as determined by ASTM E96-15 procedure A at 73° F. and 50% RH.

In some embodiments, the panels 304 include discrete layers of different materials. In other embodiments, the panels 304 may include one or more layers of foam and lignocellulose. Each of these discrete layers and the resulting panel 304 is semi-permeable. When more than one layer is included in the panel, each layer may also be semi-permeable. In certain embodiments, the semi-permeable characteristics of each layer may be substantially the same; in other embodiments, slight variations or differences may exist.

Any suitable adhesive may be used to bind the materials forming the panel 304. The adhesive may be any glue, binder, or resin that can be mixed, blended, or otherwise contacted with the panel-forming materials and at least partially cured to provide the panel 304. Non-limiting examples of suitable adhesives for forming the panel 304 include isocyanate resins; aldehyde-based resins, such as urea-formaldehyde resins, phenol-formaldehyde resins, melamine-formaldehyde resins, phenol-urea-formaldehyde resins, resorcinol-formaldehyde resins, phenol-resorcinol-formaldehyde resins, and melamine-urea-formaldehyde resins: oxidative binder compositions that are formed by contacting one or more free radical precursors with the lignocellulose substrates and optionally one or more polyphenolic compounds: or any mixture thereof. Engineered wood panels 304 can be obtained from, for example, Georgia-Pacific (Atlanta, Georgia), Louisiana-Pacific (Nashville, Tennessee), Weyerhaeuser (Seattle, Washington), Norbord Inc. (Toronto, Canada), Boise Cascade (Boise, Idaho), Roseburg Forest Products (Springfield, Oregon), or Arauco (Santiago, Chile).

According to certain embodiments, at least one or more barrier overlays 303 may be combined with the panel 304 to form the sheathing panel 300. The barrier overlay 303 is described in further detail according to various embodiments below. The barrier overlay 303 may be attached to either one or both sides of the panel 304. When the panel 303 is a substrate having one side that is smoother to the touch than the other, for example, an OSB panel, the barrier overlay 303 is applied to the smoother side. One or more panels 304 may be combined with the barrier overlay 103.

In some embodiments, an adhesive 305 is disposed on the panel 304, and the barrier overlay 303 is disposed on the adhesive 305, or vice versa. The adhesive 305 binds the barrier overlay 303 to the panel 304. The layer of adhesive 305 has a water vapor permeance of at least 1.0 perm. The adhesive 305 may or may not be water soluble. The adhesive 305 may be any adhesive material that is compatible with the panel 304 material and the barrier overlay 303 material. In some embodiments, the panel 304 includes lignocellulose, the barrier overlay 303 includes paper, and the adhesive 305 is compatible with lignocellulose and paper.

Non-limiting examples of suitable adhesives 305 include isocyanate resins (e.g., methylene diphenyl diisocyanate (MDI)): diethylene divinyl acetate resins; ethylene vinyl acetate resins; polyvinyl alcohol resins; aldehyde-based resins, such as urea-formaldehyde resins, phenol-formaldehyde resins, melamine-formaldehyde resins, phenol-urea-formaldehyde resins, resorcinol-formaldehyde resins, phenol-resorcinol-formaldehyde resins, and melamine-urea-formaldehyde resins: oxidative binder compositions that are formed by contacting one or more free radical precursors with a lignocellulose substrate and optionally one or more polyphenolic compounds; or any mixture thereof. In one or more embodiments, the adhesive 305 is an ethylene vinyl acetate (EVA) emulsion. In other embodiments, the adhesive 305 is a cross-linking adhesive. In some embodiments, the adhesive 305 is a mixture or copolymer of methylene diphenyl diisocyanate (MDI) and ethylene vinyl acetate (EVA). When an adhesive 305 is used, the adhesive 102 has a water vapor transmission rate and water vapor permeance greater than or equal to the panel 304.

In other embodiments, the barrier overlay 303 is attached or secured to the panel 304 without an adhesive by any suitable method. For example, the barrier overlay 303 is joined, fastened, secured, contacted, affixed, or connected to the panel 304 by using one or more suitable fastening devices or methodologies. Non-limiting examples of suitable fastening devices include staples, nails, screws, rivets, clamps, and the like. Non-limiting methodologies include applying heat or pressure.

The barrier overlay 303 provides the sheathing panel 300 with an air, water, moisture, light, precipitation, wind, and general environmental barrier. The barrier overlay 303 is water-resistant yet allows water vapor to permeate, as described below. When the adhesive 305 is used to bind the barrier overlay 303 to the panel 304, the adhesive 305 does not substantially interfere with the above-described properties.

The barrier overlay 303 is semi-permeable. Moisture travels bi-directionally and at substantially the same rate throughout the barrier overlays 303. The barrier overlay 303 has a substantially homogenous water vapor transmission rate and water vapor permeance. The barrier overlays 303 has a water vapor permeance in a range from about 1.0 to about 10.0 perms as determined by ASTM E96-15 procedure A at 73° F. and 50% RH. In some embodiments, the barrier overlay 303 has a water vapor permeance of at least 1.3 perms as determined by ASTM E96-15 procedure A at 73° F. and 50% RH. In other embodiments, the barrier overlay 303 has a water vapor permeance about or in any range from about 1.0, 1.3, 1.5, 1.7, 2.0, 2.5, 3.0, 3.5, 4.0, 4.5, 5.0, 5.5, 6.0, 6.5, 7.0, 7.5, 8.0, 8.5, 9.0, 9.5, and 10.0 perms as determined by ASTM E96-15 procedure A at 73° F. and 50% RH.

In one or more embodiments, the barrier overlay 303 includes a base paper and a water-resistant layer (coating or film) arranged thereon. The base paper is a paper substrate including lignocellulosic fibers or cellulosic fibers. The base paper may be a kraft paper. Non-limiting examples of suitable cellulosic fibers include any fibers incorporating cellulose as a constituent. The cellulosic fibers may be secondary, recycled fibers. The cellulosic fibers may be hardwood fibers, such as hardwood kraft fibers, hardwood sulfite fibers, softwood fibers, such as softwood kraft fibers, softwood sulfite fibers, or any combination thereof. In some embodiments, the base paper is a thin paper, or a supercalendered paper. The base paper may be any color(s). In some embodiments, suitable paperboard material that can be used for the base paper is cupstock or paperstock, and the water-resistant layer is a polymeric film that is extruded onto the surface of the base paper. The polymeric film can include one or more additives or pigments. Cupstock includes, for example, solid bleached sulfate ("SBS") from Georgia-Pacific (Atlanta, Georgia.). In one or more embodiments, the base paper has a basis weight in a range from about 20 grams per square meter (gsm) to about 350 gsm, or from about 20 pounds (lb)/3000 square foot ($ft^2$) to about 100 lb/1000 $ft^2$. In other embodiments, the base paper has a basis weight in a range from about 20 gsm to about 60 gsm. The base paper directly contacts the adhesive, when used. However, the adhesive is applied in such a manner that that it does not substantially impregnate (or substantially penetrate) the base paper. The adhesive remains on a top surface of the base paper.

The water-resistant layer provides the base paper with a weather-resistant barrier. The water-resistant layer is any air, water, moisture, light, precipitation, wind, and/or general environmental barrier. The water-resistant layer provides a water-resistant and bulk water-repellant barrier that is also substantially permeable to water vapor (allows water vapor to pass through). The water-resistant layer is applied to the base paper to substantially cover the surface of the base paper. Like the adhesive, the water-resistant layer does not substantially impregnate or substantially penetrate the base paper. Impregnation or penetration of the water-resistant layer into the base paper would make the base paper brittle and prone to cracking. The water-resistant layer is chosen such that it remains disposed on the top surface of the base paper. In some embodiments, the water-resistant layer is a melamine coating. However, the water-resistant layer is not limited and may include one or more polymers and/or synthetic materials provided that the water-resistant coating is bulk water resistant and water vapor permeable. The water-resistant layer may cure as a substantially colorless layer. In other embodiments, the water-resistant layer is an acrylic coating. The types of materials used for the water-resistant layer is not intended to be limited and may generally vary depending on the type of surface properties desired for the sheathing panel.

According to one or more embodiments, the barrier overlay 303 further includes an anti-skid coating arranged on a water-resistant coating. The anti-skid coating may be applied when the sheathing panels need additional skid-resistance, for example, when used on roofs or on vertical sides to prevent ladder slippage. The anti-skid coating is applied over the water-resistant coating. The anti-skid coating may or may not cover the entire surface of the water-resistant layer. The anti-skid coating is generally not physically observable by the naked eye. Because the anti-skid coating cannot be seen with the naked eye, a panel having the coating feels smooth to the touch. However, the anti-skid coating may be seen using an electron microscope or atomic force microscope (AFM). Embodiments provide a weather-resistant barrier with desirable skid-resistance that can be made on conventional rotogravure machinery. The anti-skid coating is substantially invisible as it also cannot be felt with one's hand because it is free of any protrusions, indentations, suppressions, or impressions. The anti-skid coating provides a skid-resistant surface that is substantially smooth yet provides an increased coefficient of friction. The anti-skid coating provides the barrier overlay 303 with a dry coefficient of friction (HK) of at least 0.6. The dry coefficient of friction is measured according to American Society for Testing and Materials International (ASTM International) standard F1679-04. For comparison, the barrier overlay 303 without the anti-skid coating (the water-resistant layer over the base paper) may have a dry coefficient of friction of about 0.52 to 0.58. When the panel 304 is an OSB, the "screen-side" (or rougher side) of the panel 304 may have a dry coefficient of friction of about 0.75 to 0.85. Other commercially available barrier overlays 303 that utilize embossing or texturizing processes to provide a skid-resistant surface have a dry coefficient of friction of about 0.63 to 0.69. Accordingly, embodiments of the anti-skid coating provide an increased coefficient of friction without embossing, texturizing, or other like processes. The anti-skid coating is substantially free of embossing and texture, as seen by the naked eye. In some embodiments, the barrier overlay 303 with the anti-skid coating has a dry coefficient of friction is in a range from about 0.6 to about 1.0. In other embodiments, the barrier overlay 303 with the anti-skid coating has dry coefficient of friction is in a range from about 0.65 to about 0.75. Yet, in other embodiments, the anti-skid coating increases the dry coefficient of friction by at least 0.1, or about 0.1 to about 0.4.

The anti-skid coating is formed by applying a coating in any desired pattern. The anti-skid coating may be an ink formulation. The anti-skid coating may include any polymer, dye, pigment, or ink formulation. The anti-skid coating may include a urethane material. The anti-skid coating may be any geometric pattern or design. The anti-skid coating may also include a non-repeating design. The anti-skid coating may be disposed onto the base paper, over the water-resistant coating, in any suitable design or array to provide skid-resistance properties and desired dry coefficients of friction. The anti-skid coating may be applied to the base paper over the water-resistant layer in an amount that may generally vary depending on the formulation of the anti-skid coating, the pattern or design, and the desired coefficient of friction. In some embodiments, the anti-skid coating may cover, for example, about 1 to about 10% of the base paper surface area. In other embodiments, the anti-skid coating covers from about 2 to about 25% of the base paper surface area. In some embodiments, the anti-skid coating covers from about 25 to about either 50% or 100% of the base paper surface area. In other embodiments, the anti-skid coating overs from about 1 to about 100% of the base paper surface area. In any embodiment where the anti-skid coating covers less than 100% of the base paper surface area, the coverage may be continuous or discontinuous in nature (i.e., forming specific patterns).

When the anti-skid coating is formed from a repeating pattern, the dimensions of the repeating unit may generally vary. In some embodiments, the repeating unit is about 0.01 to about 1 square inches (inch$^2$). In other embodiments, the repeating unit is about 0.05 to about 0.5 inch$^2$. Yet, in other embodiments, the repeating unit is about 0.07 to about 0.2 inch$^2$. Still yet, in other embodiments, the repeating unit is any repeating geometric shape or combination of geometric shapes, letters, numbers, or designs. According to one or more embodiments, the coating that forms the anti-skid coating is applied in a geometric repeating pattern or a natural wood design as a small-scale pattern. The anti-skid coating is incorporated, applied, coated, or printed onto the base paper by any methods known in the art. In some embodiments, the anti-skid coating is formed by printing the coating formulation onto the base paper. Printing may be performed, for example, using a rotogravure machine.

According to some embodiments, the barrier overlay 303 includes one or more additional layers in addition to the water-resistant layer and the anti-skid coating. The additional layers or coatings may be, for example, anti-ultraviolet (UV) coatings, anti-infrared (IR) coatings, anti-reflective coatings, anti-microbial coatings, antioxidant coatings, pigment/ink layers, or other like coatings. The additional layers or coatings may be provided below, intermediate, or above (relative to) the water-resistant layer and/or the anti-skid coating. Any additional layers or coatings and/or relative positioning thereof may be used, provided that the coatings or layers do not interfere with the properties of the resulting panel or system. One or more additives may also be incorporated into the water-resistant coating.

According to one or more embodiments, the barrier overlay 303 includes a base paper, a first pigment layer, a water-resistant coating, and optionally, an anti-skid coating. In some of these and other embodiments, the barrier overlay 303 may not include the anti-skid coating. The first pigment layer is disposed on the surface of the base paper before applying the water-resistant coating. The first pigment layer may be an ink or pigment of any color or colors. The first pigment layer may substantially cover the surface of the base paper as a solid layer, or the pigment layer may partially cover the surface of the base paper. The first pigment layer may be any desired color. In one or more embodiments, the starting base paper is white, and the first pigment layer includes a gray pigment. Non-limiting examples of suitable inks or pigments for the first pigment layer include organic dyes.

According to other embodiments, the barrier overlay 303 includes a base paper, a first pigment layer, a second pigment layer, a water-resistant coating, and optionally, an anti-skid coating. In some of these and other embodiments, the barrier overlay 303 may not include the anti-skid coating. The second pigment layer may partially cover the surface of the base paper, or the second pigment layer may substantially cover the surface of the base paper as a solid layer. The second pigment layer may be applied to the base paper in any design or pattern and in any amount desired. For example, the second pigment layer may be applied in a design, logo, image, or pattern. When applied over the first pigment layer, the first pigment layer provides a background color. The second pigment layer may be an ink or pigment of any color or colors. Non-limiting examples of suitable inks or pigments for the second pigment layer include organic dyes.

After securing the barrier overlay 303 to the panel 304, the resulting sheathing panel has at least the following properties. The sheathing panel 304 is bulk water resistant, water vapor semi-permeable, and air impermeable. As used herein, the term "bulk water resistant" means passing (i.e., no visible water penetration) after 15 minutes of testing at 2.5 pounds per square foot (psf) per the ASTM E331-00 (2016) standard.

Air permeability is measured according to ASTM International test method ASTM E2357-11 (Standard Test Method for Determining Air Leakage of Air Barrier Assemblies). The sheathing panel is substantially air impermeable, having an air infiltration rate of less than 0.2 liters per second per square meter (L/s-m$^2$) at 75 pascals (Pa), as measured by ASTM E2357-11.

Water vapor transmission rate is measured according to ASTM E96-15 procedure A (at 73° F. and 50% relative humidity (RH)) (Standard Test Methods for Water Vapor Transmission of Materials). The sheathing panel has a water vapor transmission rate (WVTR) of at least 7.0 grams/m$^2$/24 hours as determined by ASTM E96-15 procedure A (at 73° F. and 50% relative humidity (RH)). In some embodiments, the sheathing panel has a WVTR in a range from about 7.0 to about 60.0 grams/m$^2$/24 hours. In other embodiments, the sheathing panel has a WVTR in a range from about 7.5 to about 500 grams/m$^2$/24 hours. In still other embodiments, the sheathing panel has a WVTR in a range from about 60 to about 250 grams/m$^2$/24 hours.

The sheathing panel 300 has a water vapor permeance of at least 1.3 perms as determined by ASTM E96-15 procedure A at 73° F. and 50% RH. In some embodiments, the sheathing panel 300 has a water vapor permeance in a range from about 1.5 to about 25.0 perms. In other embodiments, the sheathing panel 303 has a water vapor permeance in a range from about 1.5 to about 50 perms. In other embodiments, the sheathing panel 100 has a water vapor permeance about or in any range from about 1.3, 1.4, 1.5, 1.6, 1.7, 1.8, 1.9, 2.0, 5.0, 10.0, 15.0, 20.0, 25.0, 30.0, 35.0, 40.0, 45.0, and 50.0 perms as determined by ASTM E96-15 procedure A at 73° F. and 50% RH.

The sheathing panel 300, like the individual layers, is at least semi-permeable. Moisture travels bi-directionally and at substantially the same rate throughout the sheathing panel. The sheathing panel 300 has a substantially homogenous water vapor transmission rate and water vapor permeance.

According to some embodiments, a sheathing panel 300 includes a barrier overlay 303 attached to a panel 304 (first panel) and one or more additional panels. The second panel can provide additional benefits, such as enabling adherence to more stringent energy codes, for example, the 2015 International Energy Conservation Codes (IECC). The second panel can include one or more layers. The second panel can have the same or one or more different characteristics than the panel 304. The second panel is semi-permeable. The second panel is a substrate that includes one or more materials or fibers. Non-limiting examples of suitable materials for the second panel include foam, glass, carbon, lignocellulose (also termed lignocellulosic materials), polymers (e.g., polyolefins (such as polypropylene and polyethylene) and polystyrenes), gypsum, metals, cement, or geopolymers, or any combination thereof. The second panel may be a lignocellulose composite panel including engineered wood products. Engineered wood products include a plurality of substrates composed of wood and/or lignocellulose materials and one or more adhesives to bind, couple, bond, affix, or otherwise join the plurality of materials to one another to form the engineered wood product. Non-limiting illustrative examples of engineered wood products include particleboard, fiberboard (e.g., medium density fiberboard (MDF) and high-density fiberboard (HDF)), wafer board, oriented strand board (OSB), plywood, laminated veneer lumber (LVL), laminated veneer boards (LVB), engineered wood flooring, and the like. In some embodiments, panel 304 includes lignocellulose (e.g., plywood or OSB), and second panel includes foam. In other embodiments, panel 304 includes foam, and second panel includes lignocellulose. Yet, in other embodiments, panel 304 includes two layers, a foam layer in contact with the barrier overlay 303 and a lignocellulose layer, and second panel includes foam.

In some embodiments, a sheathing panel 300 includes drainage spacers arranged on the barrier overlay 303. The drainage spacers provide improved water drainage and drying from the surface of the sheathing panel. The drainage spacers will be arranged between the barrier overlay 303 and the cladding (e.g., brick, siding, etc.). The drainage spacers can have any size, shape, or dimensions. The barrier overlay 303 can include any number of drainage spacers.

According to one or more embodiments, sheathing panels 300 are arranged on a building. To form a sheathing panel system, one or more sheathing panels are disposed onto a frame or other support member to provide a supported sheathing assembly. The frame can be or include, but is not limited to, a wood frame, metal frame, concrete or cement frame, cinder block frame, or any combination thereof. The frame can be configured to provide an enclosed structure such as a house, garage, trailer, or other residential structure. The frame can be configured to provide an enclosed structure, such as a commercial building, warehouse, storage building, or any other commercial structure. The sheathing panels 300 can be disposed about a portion of the frame or the entire frame to provide an enclosed structure. The sheathing panels 300 are arranged edge to edge. The panel system includes at least two adjacent panels. Each panel has an outer surface, an inner surface, and at least one edge extending therebetween. Each sheathing panel 300 is aligned with its at least one edge proximate to the at least one edge of the adjacent panel to define a longitudinal joint between the two adjacent panels, and wherein the edges of the adjacent panels are substantially parallel to each other. The sheathing assembly can be disposed about the frame with the barrier overlay 303 oriented towards the outside, i.e., away from the frame. In other words, the sheathing panel 304 of the sheathing assembly can be oriented toward and/or can at least partially contact the frame. The sheathing assembly can provide or otherwise make up a portion of a building structure's wall, roof, and/or floor.

In one or more embodiments, a plurality of sheathing panels 300 can be disposed on the frame such that each sheathing panel is spaced apart. For example, a gap (or longitudinal joint) of at least 1 mm, at least 2 mm, at least 3 mm, at least 4 mm, or at least 5 mm can be provided between adjacent sheathing panels 300. In certain embodiments, the gap may be on all sides of a sheathing panel 300 adjacent to another such panel; in other embodiments, the gap may only be on one pair of opposing sides, as may be desirable. Yet, in other embodiments, the sheathing panels 300 are arranged with their edges substantially flush with one another on all sides thereof, without a gap therebetween.

Because the surface of the sheathing panels 300 are substantially flat and smooth without readily visible ridges and/or valleys, a thin, low-profile tape may be used to seal the gaps between the sheathing panels 300. The tape may be a pressure sensitive adhesive tape. A specialized applicator and/or high pressure are not needed to apply the tape because the panels are substantially flat and smooth. The tape is therefore easy to apply. The tape may have ridges along each edge for easy tearing. In one or more embodiments, tape can be disposed along each seam or gap between the one or more sheathing panels 300. The tape can provide a water and/or air resistant seal. The tape is bulk water resistant, water vapor impermeable due to a backing, and air impermeable. Although, in other embodiments, the tape may be water vapor permeable. In some embodiments, the tape is at least as water vapor impermeable as the sheathing panel 100. Illustrative tapes can include, but are not limited to, building code compliant tapes, such as those sold by the Pactiv Corporation and/or Georgia-Pacific Wood Products LLC. Other suitable tapes 702 include those that meet the Pressure Sensitive Tape Council test methods PSTC 101 and 131. Instead of a tape, the sheathing panels may be joined by an edge seal or edge coating disposed thereabout. The edge seal/coating can reduce or prevent water and/or air from penetrating into the edges and sides of the sheathing panels. The edge seal/coating can include one or more paints, pastes, lacquers, laminates, waxes, gels, glues, epoxies, polymeric materials, resins, expanding foams, or any combination thereof.

Two sheathing panels 300 can be joined together at any suitable angle with respect to one another. Sheathing panels 300 can be joined or positioned with respect to one another at any angle. For example, the sheathing panels 300 may be joined end-to-end, or rotated at an angle with respect to one another. In one or more embodiments, the longitudinal joint provided between the sheathing panels 300 can be located at any location about a structure, for example a corner, a roof seam or joint, a floor seam or joint, a wall seam or joint, and the like.

When two sheathing panels 300 are joined to form a corner or joint, having any angle, the corner sealing polymeric material may be used to seal the joint therebetween. The corner sealing polymeric material is relatively rigid or stiff. The thickness of the polymeric material forming the sides may generally vary. In some embodiments, the polymeric material has a thickness in a range from about 0.008 inch to about 0.20 inch, or from about 0.010 inch to about 0.012 inch. The polymeric material may include one or more polymers and/or copolymers. The polymeric material may include, but is not limited to, an acrylic or acrylate polymer, a polyvinyl chloride polymer, a polycarbonate polymer, a polyethylene polymer, a polypropylene polymer, an ethylene propylene diene monomer rubber, a polysulfone polymer, a polyacrylonitrile polymer, a polystyrene polymer, an acrylonitrile butylene styrene polymer, or copolymer thereof.

EXAMPLES

Example 1: Sheath Materials

Tubing for cylindrical sheaths (Table 1) were cut to various lengths, including ¼ and ½ inches, and installed on nail shanks between the tip of the nail and the collating sleeve. Nails were shot into the narrow side of a 2×4 using pneumatic nail gun.

TABLE 1

| | | Test tubing | | |
|---|---|---|---|---|
| Tubing | Material | Internal diameter (inch) | External diameter (inch) | Softness (durometer-Shore A) |
| 1 | Firm polyurethane tubing for air and water, opaque | 1/64 | 3/16 | 95A |
| 2 | Polyvinyl chloride (PVC) soft plastic tubing for air and water, clear red | 1/8 | 3/16 | 70A |
| 3 | Abrasion-resistant polyurethane tubing for air | 1/8 | 3/16 | 70A |
| 4 | Oil-resistant Buna-N rubber tubing | 1/8 | 3/16 | 60A |

As shown in FIGS. 4A-4D, the 60A Buna-N rubber tubing (tubing 4, FIG. 4D) performed the best at ¼ inch long. Tubing 1-3 (FIGS. 4A-4C) with softnesses of 70-95A durometer were too hard/stiff and would not deform to seal the nail heads.

Example 2: Sheath Lengths

Figure 5:
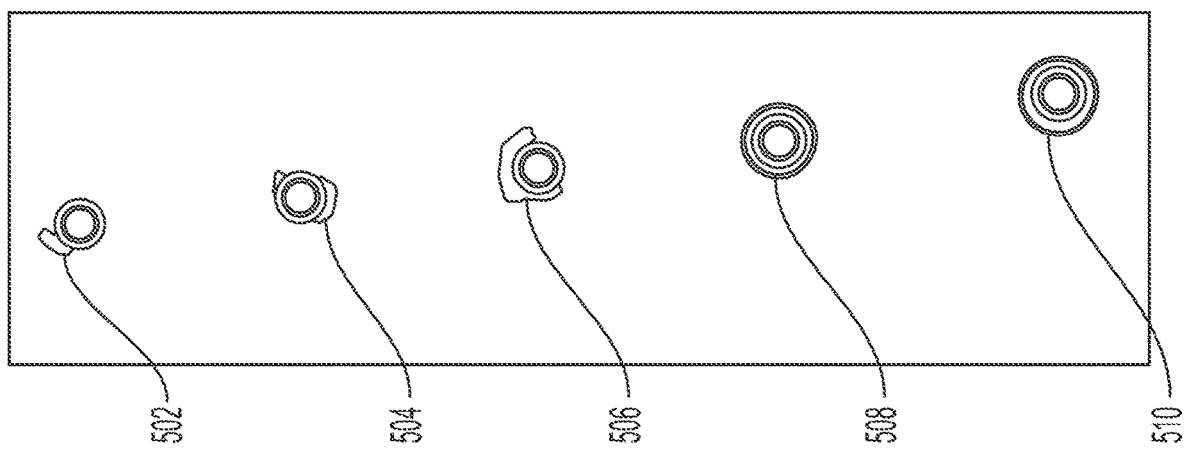
FIG. 5 shows sealed fasteners using various length tubing.

Tubing material 4 (Table 1, 60A Buna-N rubber tubing) was cut to various lengths, from ¼ inch to 1 inch, and driven into a 2×4. As shown in FIG. 5, at 1 inch (502), ¾ inch (505), and ½ inch (506), too much material rolled up around the nail heads, breaking the seals. At ⅜ inch (508) and ¼ inch (510), material rolled up around the nail head, and the seals remained intact.

Example 3: Fastener Leakage Tests

Tubing material 4 (Table 1, 60A Buna-N rubber tubing) cut to ¼-⅜ inches in length was used to seal various nails in sheathing panels. Fastener leakage tests were performed according to ASTM D1970. Smooth shank nails, ring shank nails, and 2.5-inch roof nails were tested. After sealing the nails in the sheathing panels, a 5-inch water column was arranged on the sealed fasteners for at least 3-days to test for leakage at the fastener sites. Controls were also tested, which were nails without a sealing tubing. Any leak indicated a failure.

All treated nails passed (n=10), with no leaks after 3-days, as well as up to 23-days. All controls (n=30) failed after 24-hours.

Example 4: Assembly Water Penetration Tests

Tubing material 4 (Table 1, 60A Buna-N rubber tubing) cut to ¼-⅜ inches in length was used to seal nails in a sheathing panel, and the ability to prevent water penetration after structural loading through the sheathing assembly was tested. Water was sprayed on the board at a rate of 3.4 liters per square meter (L/m$^2$) or 5 gallons per square foot hour (gal/ft$^2$-hr) for 15-minute cycles to simulate pressure conditions of the ASTM E331 water penetration wall test. Any leak in the field of the panel was a failure. Code pressure thresholds were 137 pascals.

Table 2 shows the number of leaks during 30-minute cycles after structural loading. The code pressure was achieved before leaks were observed for all sealed nails. The sealed smooth shanks and controls did not have leaks up to 137 pascals. The sealed ring shanks did not have leaks up to 300 pascals. The sealed roofing nails did not have leaks up to 900 pascals.

TABLE 2

Water penetration after structural loading

| Pressure (Pascals) | Control | Smooth shank | Ring shank | Roof nail, 2.5 inch |
|---|---|---|---|---|
| 0 | 0 | 0 | 0 | 0 |
| 137 | 0 | 0 | 0 | 0 |
| 300 | 1 | 1 | 0 | 0 |
| 600 | 3 | 1 | 1 | 0 |
| 900 | 5 | 1 | 1 | 0 |
| 1000 | 4 | 1 | 1 | 1 |

Example 5: Percent Water Absorption

Tubing material 4 (Table 1, 60A Buna-N rubber tubing) cut to ¼-⅜ inches in length was used to seal nails in a 2×4, and the % water absorption (n=5) was measured over time and following application of 0.5-5-inch water columns. Table 3 shows the correlation of pressure to inches of water, simulating ASTM E331 wall water penetration testing.

TABLE 3

Pressure and inches of water

| Pascals | Pounds force per square foot (PSF) | Pounds force per square inch (PSI) | Inches of water | Code |
|---|---|---|---|---|
| 137 | 2.86 | 0.019 | 0.55 | Code as of 2021 |
| 300 | 6.27 | 0.043 | 1.2 | 2x code |
| 600 | 12.53 | 0.087 | 2.41 | 4x code |
| 900 | 18.79 | 0.131 | 3.61 | 6x code |
| 1200 | 25.06 | 0.174 | 4.82 | 8x code |

TABLE 4

Percent (%) water absorption

| Condition | 0.5-hour at 0.5-inch water | 1-hour at 1-inch water | 24-hours at 5-inches water | % pass (no leaks) |
|---|---|---|---|---|
| Smooth shank 1 | 0.2% | 0.2% | 3.2% | 100% |
| Smooth shank 2 | 0.4% | 0.4% | 21.4% | 0% |
| Smooth shank control (not sealed) | 0.4% | 0.4% | 18.4% | 0% |
| Ring shank 1 | 0.4% | 0.2% | 12.7% | 20% |
| Ring shank 2 | 0.2% | 0.2% | 19.8% | 0% |
| Ring shank control (not sealed) | 0.2% | 0.2% | 19.8% | 0% |
| No nail control | 0.1% | 0.1% | 1.2% | 100% |

Table 4 shows percent (%) water absorption over time. As shown in Tables 4, smooth shank self-sealed fasteners passed and prevented leaks with up to 5-inches of water (1200 pascals), which is 8× code (see Table 3). After 21 days, no leaks were observed. In contrast, all controls leaks almost immediately.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A fastener sleeve comprising:
   a collating sleeve body; and
   a plurality of cylindrical sheaths positioned wholly within the collating sleeve body, each cylindrical sheath having an elongate body having opposing open ends such that each cylindrical sheath surrounds and is engageable with a respective one of a plurality of fasteners,
   wherein:
      each cylindrical sheath of the plurality of cylindrical sheaths has a length of about ¼ to about ½ inch; and
      each cylindrical sheath comprises a polymeric material having a softness of either: about 30 to about 80 durometer—Shore A as measured by ASTM D2240 type A; or between 1 and 30D durometer—Shore D as measured by ASTM D2240 type D, the softness being such that, in use, the plurality of cylindrical sheaths provides a self-sealing of the plurality of fasteners.

2. The fastener sleeve body of claim 1, wherein the polymeric material is polyvinyl carbonate, polyurethane, or a combination thereof.

3. The fastener sleeve of claim 1, wherein each cylindrical sheath comprises a nitrile elastomer.

4. A fastener assembly comprising:
   the fastener sleeve of claim 1 having the collating sleeve body thereof positioned along a first portion of a plurality of fasteners extending through the plurality of cylindrical sheaths; and
   a collating envelope positioned along a second portion of the plurality of fasteners, the second portion being different and spaced from the first portion such that a third portion of the plurality of fasteners is exposed between the collating envelope and the plurality of cylindrical sheaths.

5. The fastener sleeve body of claim 1, wherein the collating sleeve body is adhered to the plurality of cylindrical sheaths by an adhesive.

6. A sheathing panel, comprising:
   at least one barrier overlay secured to at least one side of a panel;
   a plurality of fasteners comprising a body portion and a head portion, the body portion engaged in the barrier overlay and the panel, and the head portion at least partially exposed adjacent an outer surface of the sheathing panel; and
   a plurality of sealing cylindrical sheaths surrounding a portion of each body portion and positioned between the head portion of each fastener and the barrier overlay,
   wherein:
      each of the plurality of sealing cylindrical sheaths have opposing open ends such that the portion of each body portion of the plurality of fasteners beyond the surrounded portion thereof extends through and beyond both of the opposing open ends;
      each of the plurality of sealing cylindrical sheaths is positioned wholly within a collating sleeve body;
      the sheathing panel is bulk water resistant surrounding the plurality of fasteners and has at least one of the following properties: a water vapor transmission rate of at least 7.0 grams per square meter per 24 hours (grams/m$^2$/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m$^2$) at 75 pascals (Pa) as determined by ASTM E2357-11;
      each cylindrical sheath of the plurality of cylindrical sheaths has a length of about ¼ to about ½ inch; and
      each cylindrical sheath comprises a polymeric material having a softness of either: about 30 to about 80 durometer—Shore A as measured by ASTM D2240 type A; or between 1 and 30D durometer—Shore D as measured by ASTM D2240 type D, the softness being such that, in use, the plurality of cylindrical sheaths provides a self-sealing of the plurality of fasteners.

7. The sheathing panel of claim 6, wherein at least one of:
   the polymeric material is polyvinyl carbonate, polyurethane, or a combination thereof; or
   each cylindrical sheath comprises a nitrile elastomer.

8. The sheathing panel of claim 6, further comprising an adhesive securing the barrier overlay to the panel, wherein the adhesive has a water vapor permeance greater than the water vapor permeance of the sheathing panel.

9. The sheathing panel of claim 6, wherein the barrier overlay further comprises an anti-skid coating arranged on a water-resistant coating, the anti-skid coating providing the barrier overlay with a dry coefficient of friction ($\mu_k$) of at least 0.6.

10. A method of engaging a plurality of fasteners with a sheathing panel, the method comprising:
   providing a plurality of fasteners for driving into a sheathing panel comprising a barrier overlay secured to a panel, the fasteners comprising body portions at least partially enclosed within a plurality of cylindrical sheaths in a collating sleeve body;
   compressing each cylindrical sheath around a portion of the body portion of each corresponding fastener such that the cylindrical sheath remains around the body portion and between a head portion of the fastener and the sheathing panel;

separating the collating sleeve body from the plurality of cylindrical sheaths while driving the plurality of fasteners into the sheathing panel; and self-sealing the plurality of cylindrical sheaths around the body portion of the plurality of fasteners and between the head portion and the barrier overlay, wherein:

each of the plurality of sealing cylindrical sheaths have opposing open ends such that the portion of each body portion of the plurality of fasteners beyond the surrounded portion thereof extends through and beyond both of the opposing open ends;

each of the plurality of sealing cylindrical sheaths is positioned wholly within a collating sleeve body;

the sheathing panel is bulk water resistant surrounding the plurality of fasteners and has at least one of the following properties: a water vapor transmission rate of at least 7.0 grams per square meter per 24 hours (grams/m2/24 hours) as determined by ASTM E96-15 procedure A at 73° F. and 50% relative humidity (RH), a water vapor permeance of at least 1.3 perms as determined by ASTM E96-15 procedure A at 73° F. and 50% relative humidity (RH), or an air infiltration rate of less than 0.2 liters per second per square meter (L/s-m2) at 75 pascals (Pa) as determined by ASTM E2357-11;

each cylindrical sheath of the plurality of cylindrical sheaths has a length of about ¼ to about ½ inch; and each cylindrical sheath comprises a polymeric material having a softness of either: about 30 to about 80 durometer—Shore A as measured by ASTM D2240 type A; or between 1 and 30D durometer—Shore D as measured by ASTM D2240 type D, the softness being such that, in use, the plurality of cylindrical sheaths provides a self-sealing of the plurality of fasteners.

11. The method of claim 10, wherein:

the polymeric material is polyvinyl carbonate, polyurethane, or a combination thereof.

12. The method of claim 10, wherein either:

each cylindrical sheath comprises a nitrile elastomer; or the panel is a lignocellulose composite panel.

13. The method of claim 10, further comprising the step of securing the barrier overlay to the panel with an adhesive having a water vapor permeance greater than the water vapor permeance of the sheathing panel.

14. The method of claim 10, wherein the plurality of cylindrical sheaths around the plurality of fasteners maintains the water vapor transmission rate, the water vapor permeance, or the air infiltration rate of the sheathing panel.

* * * * *